June 8, 1943.     C. H. KAUFMAN     2,321,489
RAKE
Filed April 18, 1942
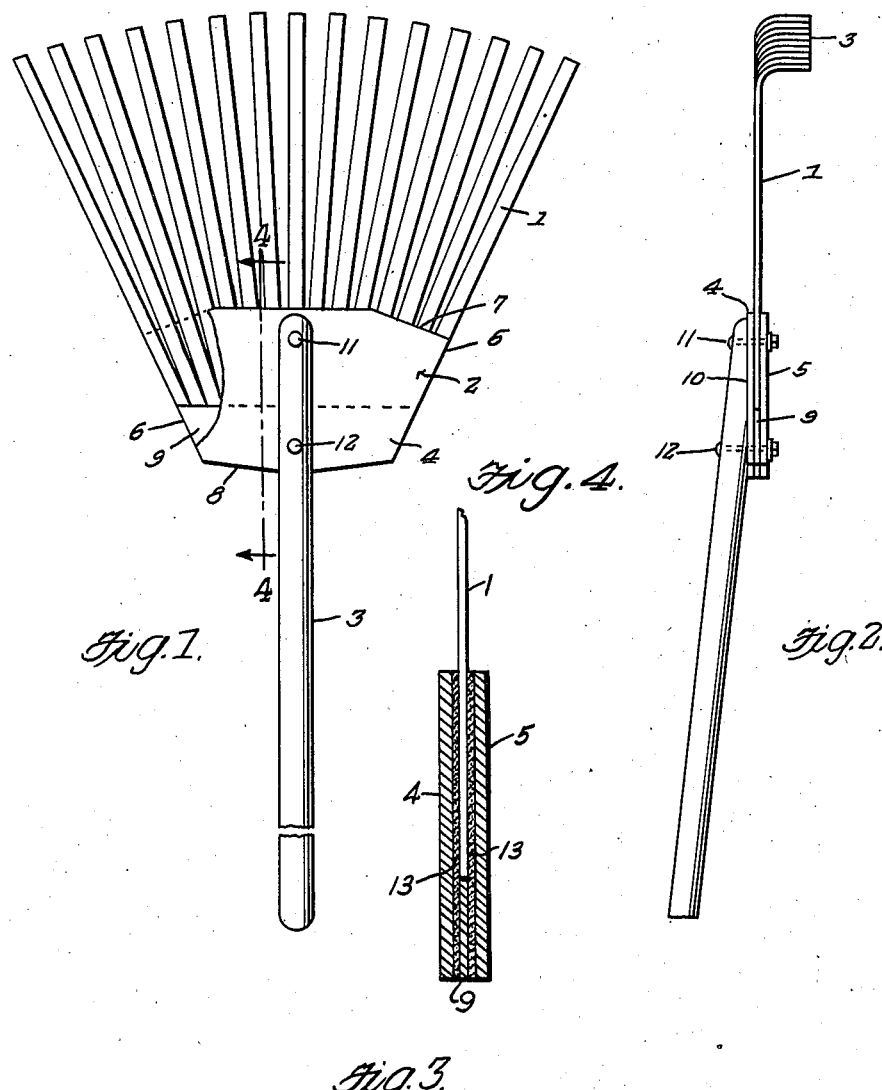
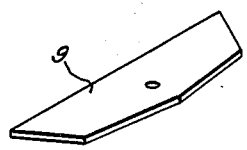
Inventor
Charles Herman Kaufman
By Clarence A. O'Brien
and Harvey B. Jacobson
Attorneys Patented June 8, 1943

2,321,489

UNITED STATES PATENT OFFICE 2,321,489

RAKE

Charles Herman Kaufman, San Antonio, Tex.

Application April 18, 1942, Serial No. 439,591

1 Claim. (Cl. 56—400.17)

My invention relates to improvements in so-called broom rakes, the principal object in view being to provide an inexpensive, light-weight, strong and durable rake, with wooden tines held in proper relation without the use of nails, staples, or similar fastening means.

To the accomplishment of the above, and subordinate objects presently appearing, a preferred embodiment of my invention has been illustrated in the accompanying drawing, set forth in detail in the succeeding description, and defined in the claim appended hereto.

In said drawing:

Figure 1 is a view in top plan, partly broken away, of the preferred embodiment of my improved rake, Figure 2 is a view in side elevation, Figure 3 is a view in perspective of the spacer panel.

Figure 4 is a view in transverse section taken on the line 4—4 of Figure 1 and drawn to an enlarged scale.

Reference being had to the drawing by numerals, my improved rake, in the illustrated embodiment thereof, comprises an assembly of tines 1, a holder 2 for the tines, and a handle 3.

The tines 2 are preferably formed of strips of tough, fiber, single ply, veneer wood, such as birch, which will stand bending to a maximum degree without breaking. The tines 1 are of uniform width and are provided with front ends correspondingly curved and terminating in angled teeth 3.

The holder 2 comprises a pair of opposed top and bottom panels 4, 5, of tough, fiber, substantially rigid plywood such as fir, said panels being elongated crosswise of the rake with forwardly diverging ends 6, front corner edges 7, inclining rearwardly, and obtuse angled rear edges 8. An elongated spacer panel 9 of the same material as the panels 4, 5 and the same thickness as the tines, but less than half the width of the panels 5, 6 is interposed flatwise between said panels 4, 5 to extend lengthwise along the rear edges thereof, said spacer panel 9 conforming at its rear edge to the shape of the rear edges of the panels 4, 5 and at its ends to the shape of the ends of said panels.

The rear ends of the tines 2 are interposed between said panels 4, 5 flatwise with the tines diverging forwardly, fanwise, and the said rear ends thereof engaging edgewise and beveled to form a flush butt joint with the front edge of the spacer panel 9. The rear ends of the tines are held in the holder by plastic cement preferably applied as follows.

The bottom panel 5 is coated on its upper face with plastic cement such as shown at 13 in Figure 4. The rear ends of the tines are then coated with such cement to the required distance on the under faces thereof and applied to said bottom panel 5. The spacer panel 9 is then similarly coated on both sides and applied on the top of the bottom panel 5. Next the top panel 4 is coated on its underface and applied over the spacer panel 9 and tines 1. With the tines 1 properly spaced in diverging relation and in the holder, said holder 2 is clamped in a press under light pressure until the cement dries.

The handle 3 is preferably round, and of substantially light strong wood with a straight side beveled 10 at its front end and is secured on top of the top panel 4 with its bevel 10 flat against the same by a pair of front and rear bolts 11, 12 extending through the handle and through the holder 2 in the transverse center of the latter.

The foregoing will, it is believed, suffice to impart a clear understanding of my invention without further explanation.

Manifestly the invention, as described, is susceptible of modifications without departing from the inventive concept, and right is herein reserved to said modifications as fall within the scope of the subjoined claim.

What I claim is:

A rake comprising a tine holder including a pair of opposed elongated top and bottom panels of plywood extending lengthwise transversely of the rake, a relatively narrower separator panel also of plywood interposed between said pair of panels and extending along rear edges thereof, a plurality of tines of single-ply wood and strip-like form having hooked front ends and extending from said holder in forwardly diverging relation with rear ends interposed between said pair of panels in front of the separator panel and fitted against the front edge of the separator panel, cement securing said panels together and the rear ends of the tines to said panels and a handle bolted to the top of said holder, said separator strip being of the same thickness as said tines.

CHARLES HERMAN KAUFMAN.